United States Patent
Ge et al.

(10) Patent No.: US 10,960,483 B2
(45) Date of Patent: *Mar. 30, 2021

(54) METHOD AND APPARATUS OF IDENTIFYING WELDING SEAMS OF A WELDING OBJECT

(71) Applicant: ABB Schweiz AG, Baden (CH)

(72) Inventors: Jingguo Ge, Shanghai (CN); Peng Kong, Shanghai (CN); Lei Mao, Shanghai (CN)

(73) Assignee: ABB Schweiz AG, Baden (CH)

( * ) Notice: Subject to any disclaimer, the term of this patent is extended or adjusted under 35 U.S.C. 154(b) by 534 days.

This patent is subject to a terminal disclaimer.

(21) Appl. No.: 15/852,229

(22) Filed: Dec. 22, 2017

(65) Prior Publication Data

US 2018/0117701 A1    May 3, 2018

Related U.S. Application Data

(63) Continuation of application No. PCT/CN2015/084914, filed on Jul. 23, 2015.

(51) Int. Cl.
*B23K 9/32* (2006.01)
*B23K 31/02* (2006.01)
(Continued)

(52) U.S. Cl.
CPC ............ *B23K 9/32* (2013.01); *B23K 9/0956* (2013.01); *B23K 9/1272* (2013.01); *B23K 9/16* (2013.01);
(Continued)

(58) Field of Classification Search
CPC .... B23K 9/0956; B23K 26/032; B23K 31/02; B23K 9/127; B23K 26/044; B23K 31/125;
(Continued)

(56) References Cited

U.S. PATENT DOCUMENTS 4,616,121 A * 10/1986 Clocksin .............. B23Q 35/128
219/124.34
8,779,324 B2 * 7/2014 Hida ..................... B23K 9/127
219/121.54
(Continued)

FOREIGN PATENT DOCUMENTS

CN        102708263 A    10/2012
CN        103273207 A     9/2013
(Continued)

OTHER PUBLICATIONS

AutoCAD_2013_users_guide (Year: 2012).*
(Continued)

*Primary Examiner* — Christopher M Koehler
*Assistant Examiner* — Chris Q Liu
(74) *Attorney, Agent, or Firm* — Taft Stettinius & Hollister LLP

(57) ABSTRACT

A method and an apparatus of identifying welding seams of a welding object. The method includes identifying intersection lines between geometrical bodies of the welding object in a three-dimensional model for the welding object, based on geometry of the geometrical bodies to form a collection of welding seams for the welding object. The method also includes eliminating hidden seams from the collection of welding seams for the welding object based on overlapping relationship among the welding seams to form a candidate seam list. Welding seams can be identified automatically and efficiently, and the method or the apparatus makes the automatic programming of the welding robot possible and thus facilitates use of a robot in welding huge and complex structures manufactured in a small batch.

20 Claims, 6 Drawing Sheets

(51) Int. Cl.
*B23K 9/095* (2006.01)
*B23K 9/16* (2006.01)
*G06T 7/12* (2017.01)
*B23K 9/127* (2006.01)

(52) U.S. Cl.
CPC ............... *B23K 31/02* (2013.01); *G06T 7/12* (2017.01); *G06T 2207/30152* (2013.01)

(58) Field of Classification Search
CPC .... B23K 9/0953; B23K 9/126; B23K 9/1276; B23K 26/03; B23K 26/04; B23K 26/043; B23K 26/12; B23K 37/02; B23K 9/02; B23K 9/0216; B23K 9/0256; B23K 9/12; B23K 9/1272; B23K 9/1278; B23K 9/16; B23K 9/32; B23K 9/095; B23K 31/12; G06T 7/12; B23Q 17/2471
USPC ..... 219/124.34, 137 R, 121.63, 136, 121.46, 219/121.54, 121.59, 121.6, 124.1, 130.01; 228/102–105
See application file for complete search history.

(56) References Cited

U.S. PATENT DOCUMENTS

| | | |
|---|---|---|
| 2003/0071810 A1 | 4/2003 | Shoov |
| 2010/0152870 A1 | 6/2010 | Wanner et al. |
| 2012/0029674 A1 | 2/2012 | Hida |
| 2013/0119040 A1 | 5/2013 | Suraba et al. |
| 2014/0348415 A1 | 11/2014 | Bhattad |
| 2015/0129645 A1 | 5/2015 | Toscano |

FOREIGN PATENT DOCUMENTS

| | | | |
|---|---|---|---|
| CN | 104057210 A | | 9/2014 |
| CN | 104070265 A | | 10/2014 |
| CN | 104070266 A | | 10/2014 |
| CN | 104353926 A | | 2/2015 |
| CN | 104750023 A | | 7/2015 |
| CN | 103969335 B | * | 12/2016 |
| DE | 102012219190 A1 | | 5/2013 |
| JP | S59193770 A | | 11/1984 |
| JP | 091338 A | | 1/1997 |
| JP | 10187223 A | | 7/1998 |
| JP | 2014032076 A | | 2/2014 |

OTHER PUBLICATIONS

English translation of CN103969335B (Year: 2016).*
Chinese Office Action, Chinese Patent Application No. 201580081540.X, dated Mar. 5, 2019, 10 pages including English translation.
Extended European Search Report, European Patent Application No. 15898670.3, dated Jul. 5, 2019, 7 pages.
Yochi Nagao et al., A Teaching-Free Robot System Utilizing Three-Dimensional CAD Product Data, Dec. 12, 2006, retrieved from https://pdfs.semanticscholar.org/bf2d/44d76117b9bcff1d3fdt7a939470a3f6021a.pdf, 11 pages.
The Patent Office of the People's Republic of China, Second Office Action in corresponding application No. 201580081540.X, dated Aug. 8, 2019, 11 pp.
The State Intellectual Property Office of the People's Republic of China, Search Report in corresponding application No. 201580081540.X, dated Aug. 4, 2019, 4 pp.
J. Polden et al., "Offline Programming for a Complex Welding System using DELMIA Automation," Robotic Welding, Intelligence and Automation, Lecture Notes in Electrical Engineering, dated 2011, 8 pp., vol. 88, Springer, Berlin, Germany.
Yan Yao, et al., "Construction and Quality Control of Steel Structure in Suzhou International", Expo Center Engineering Building Construction, No. 6, pp. 17-20, Jun. 2005, 11 pages.
The Patent Office of the People's Republic of China, Third Office Action in corresponding application No. 201580081540.X, dated Dec. 13, 2019, 15 pages.
The Patent Office of the People's Republic of China, Search Report in corresponding application No. 201580081540.X, 4 pages.
State Intellectual Property Office of the P.R. China, International Search Report & Written Opinion issued in corresponding Application No. PCT/CN2015/084914, dated Apr. 13, 2016, 13 pp.

* cited by examiner

| | s | Explanation | | Illustration | Relationship | Action to line 1 | Output |
|---|---|---|---|---|---|---|---|
| 1 | 0 | !Co-plane | |  | Separated | Keep | Itself |
| 2 | 0 | Co-plane but separated | |  | Separated | Keep | Itself |
| 3 | | Usually not exist in CAD model | |  | Crossed | Keep | Itself |
| 4 | 1 | h1/ t1/ h2/ t2 | |  | ConnectedNotColine | Keep | Itself |
| 5 | 2 | h1&h2/h1&t2/t1&h2/t1&t2 | |  | ConnectedNotColine | Keep | Itself |
| 6 | 0 | | |  | Separated | Keep | Itself |
| 7 | | (h1,h2), coincide | |  | ConnectedCoLine | Keep | Itself |
| 8 | | (h1,t2), coincide | |  | ConnectedCoLine | Keep | Itself |
| 9 | | (t1,h2), coincide | |  | ConnectedCoLine | Keep | Itself |
| 10 | | (t1,t2), coincide | |  | ConnectedCoLine | Keep | Itself |
| 11 | | (h1,h2), not coincide | |  | OverlapHead | Remove head | Tail (h2->t1) |
| 12 | | (h1,t2), not coincide | |  | OverlapHead | Remove head | Tail (t2->t1) |
| 13 | | (t1,h2), not coincide | |  | OverlapTail | Remove tail | Head (h1->h2) |
| 14 | 2 | (t1,t2), not coincide | |  | OverlapTail | Remove tail | Head (h1->t2) |
| 15 | | (h2,t2), not coincide | h1 closer to h2 than to t2 |  | OverlapMiddle | Remove middle | Head (h1->h2) Tail (t2->t1) |
| 16 | | | h1 closer to t2 than to h2 |  | OverlapMiddle | Remove middle | Head (h1->t2) Tail (h2->t1) |
| 17 | | (h1,t1), not coincide | |  | OverlapAll | Remove all | Empty |
| 18 | | Line1 is longer | (h1,h2,t2) |  | OverlapHead | Remove head | Tail (t2->t1) |
| 19 | | | |  | OverlapHead | Remove head | Tail (h2->t1) |
| 20 | | | (t1,h2,t2) |  | OverlapTail | Remove tail | Head (h1->h2) |
| 21 | 3 | | |  | OVerlapTail | Remove tail | Head (h1->t2) |
| 22 | | Line1 is shorter | (h1,t1,h2) |  | OverlapAll | Remove all | Empty |
| 23 | | | |  | OverlapAll | Remove all | Empty |
| 24 | | | (h1,t1,t2) |  | OverlapAll | Remove all | Empty |
| 25 | | | |  | OverlapAll | Remove all | Empty |
| 26 | 4 | (h1,t1,h2,t2) | |  | OverlapAll_Equal | Remove all | Empty |

Fig. 9

ID OF THE INVENTION

Embodiments of the present disclosure generally relate to the field of welding, and more particularly relate to a method and apparatus of identifying welding seams of a welding object.

BACKGROUND OF THE INVENTION

Nowadays, robots are wildly used in many fields such as welding, assembling, conveying, paint spraying, laser machining, etc. A welding robot can perform welding operations automatically in a predetermined way in accordance with the robot program. In shipbuilding industry, for example, a small-type steel ship usually has 100 thousands of welds to millions of welds, which means a large amount of workloads. However, currently, the automation level of welding in shipbuilding is still rather low and it will require a great deal of manpower to perform welding operations on the ship. The main barrier of using a robot in this industry lies in that robot programming is not only time consuming but also very complex. Therefore, there is a need in the art to provide a solution of facilitate use of a robot in such a complex situation.

SUMMARY OF THE INVENTION

To this end, the present disclosure provides a solution for identifying welding seams of a welding object, so as to solve or at least partially mitigate at least a part of problems in the prior art.

According to a first aspect of the present disclosure, there is provided a method of identifying welding seams of a welding object. The method comprises identifying intersection lines between the geometrical bodies of the welding object in a three-dimensional model for the welding object based on geometry of the geometrical bodies to form a collection of welding seams for the welding object. The method further comprises eliminating hidden seams from the collection of welding seams for the welding object based on overlapping relationship among the welding seams to form a candidate seam list.

In an embodiment of the present disclosure, the apparatus may further comprises tagging the geometrical bodies of the welding object in the three-dimensional model for the welding object In another embodiment of the present disclosure, the eliminating hidden seams may comprise removing a tail section of a welding seam if the welding seam is overlapping with another welding seam at the tail section of the welding seam.

In further embodiment of the present disclosure, the eliminating hidden seams may comprise removing a head section of a welding seam if the welding seam is overlapping with another welding seam at the head section of the welding seam.

In a still further embodiment of the present disclosure, the eliminating hidden seams may comprise removing a middle part of a welding seam if the welding seam is overlapping with another welding seam at the middle part of the welding seam.

In a yet further embodiment of the present disclosure, the eliminating hidden seams may comprise removing a welding seam if the welding seam is completely overlapping with a part of another welding seam.

In another embodiment of the present disclosure, the method further comprise determining angle joint edges and butt joint edges in the collection of welding seams based on geometry of surfaces associated with the welding seams.

In a further embodiment of the present disclosure, the method further comprise editing the welding seams in the candidate seam list based on welding process requirements, to form a final welding seam list.

In a second aspect of the present disclosure, there is further provided an apparatus for identifying welding seams of a welding object. The apparatus comprises a line identification module, and an edge determination module. The line identification module is configured to identify intersection lines between the geometrical bodies of the welding object in a three-dimensional model for the welding object, based on geometry of the geometrical bodies to form a collection of welding seams for the welding object. The seam elimination module is configured to eliminate hidden seams from the collection of welding seams for the welding object based on overlapping relationship among the welding seams to form a candidate seam list.

With embodiments of the present disclosure, there is provided a solution of identifying welding seams automatically and efficiently, which makes automatic programing of the welding robot possible and thus facilitates the use of a robot in such a complex situation in welding huge and complex structures or structures manufactured in a small batch. Accordingly, the automatic level could be increased remarkably and the production cost can be reduced substantially.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein:

FIG. 9 illustrates a table of overlapping relationship of 2 straight line segments.

DETAILED DESCRIPTION OF EMBODIMENTS

Hereinafter, solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

As mentioned hereinabove, in, for example, shipbuilding industry, the automation level of welding is still rather low and the reason lies in that robot programming is not only time consuming but also very complex. Particularly, the welding seams are hard to be identified, which further provides a barrier of using robot in this industry. Therefore, in embodiments of the present disclosure, there is provided a solution for identifying welding seams of a welding object, which will be described hereinafter with reference to FIGS. 1 to 8.

Figure 1:
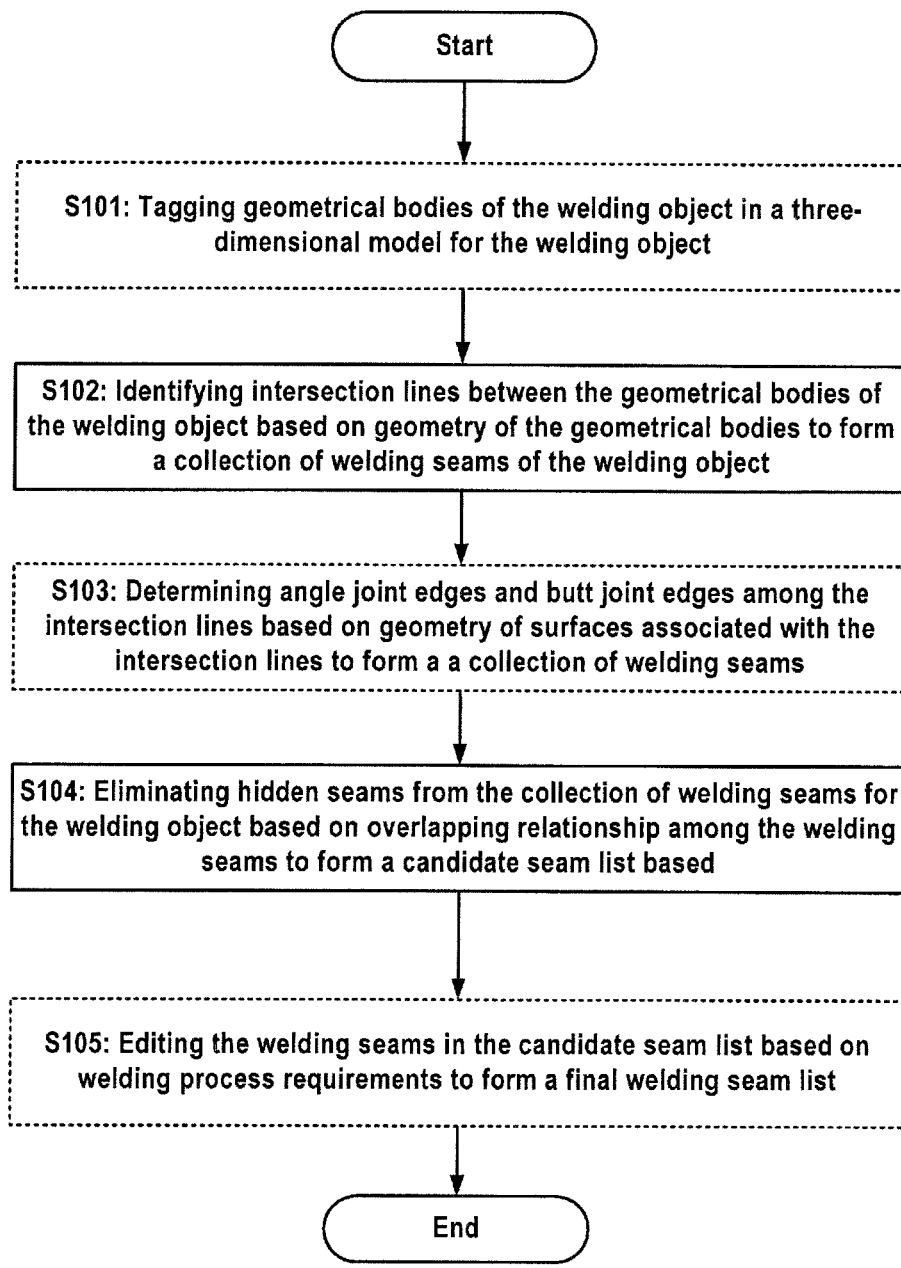
FIG. 1 schematically illustrates a flow diagram of a method of identifying welding scams of a welding object according to an embodiment of the present disclosure.

Reference is first made to FIG. 1, which schematically illustrates a flow diagram of a method of identifying welding seams of a welding object according to an embodiment of the present disclosure.

As illustrated in FIG. 1, the method starts from step 101, in which geometrical bodies of a welding object are tagged in a three-dimensional model for the welding object.

Usually, for a welding object such as a ship, a three-dimensional model will be designed before the manufacturing. This three-dimensional model may be for example a Computer Aided Design (CAD) model or any other kind of three-dimensional model. Another three-dimensional model for the robot to be used can also be built. The other three-dimensional model for the robot may also be for example a Computer Aided Design (CAD) model or any other kind of three-dimensional model. In embodiments of the present disclosure, the two three-dimensional models can be loaded into a virtual environment in for example a computer. The two models will be laid out exactly in accordance with their respective real setups.

The three-dimensional model for the welding object contains a plurality of geometrical bodies. Each of the geometrical bodies has a shape such as a cuboid, a cylinder, a cone, a sphere, a semi-sphere, or any other shape or the combination thereof. These geometrical bodies can be tagged or identified first. The tagging of the geometrical bodies can be implemented for example using methods in the art. For example, in the CAD environment, the geometrical bodies of a CAD model for an object can be identified and tagged easily. In the present disclosure, similar approaches can be used to tag these geometrical bodies. In such a way, these geometrical bodies can be tagged.

However, it shall be understood that this tagging step can be optional. In some embodiments of the present disclosure, the three-dimensional model designed for the welding object itself may have those tags for tagging or identifying the geometrical bodies. In such a case, the tagging step can be omitted.

Then at step S102, intersection lines between any two geometrical bodies can be identified based on the geometry of these geometrical bodies.

It is to be understood that the seams usually exist as intersection lines between two bodies. Thus, seams on parts of the welding object can be identified by identifying intersection lines between any two of these geometrical bodies based on geometry of the welding object. The term "geometry" used herein refers to measurement, relationships of geometrical bodies which indicate shapes, structures, location of the geometrical bodies. The intersection lines between geometrical bodies can be identified through geometry of the bodies. As an example, the intersection line identification can be identified by means of Ray Tracing, or any other common intersection line identification algorithms. Since, these algorithms are known in the art, details about the identification of the intersection lines will not be elaborated herein, for simplification purposes.

For illustrative purposes, reference will be made to FIGS. 2 to 4 to describe the intersection line identification of a welding object with a simple structure.

Figure 2:
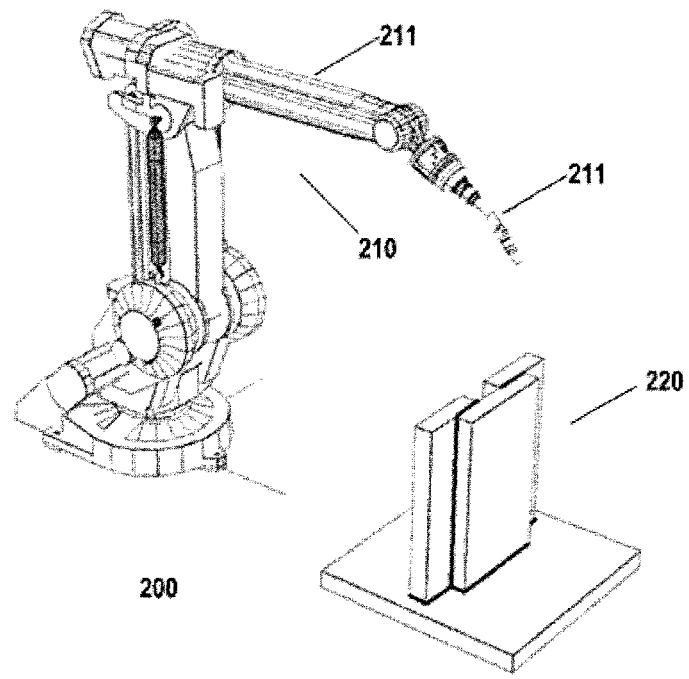
FIG. 2 schematically illustrates example three-dimensional models for a welding object and a welding robot in a virtual environment according to an embodiment of the present disclosure.

FIG. 2 schematically illustrates example three-dimensional models for a welding object and a welding robot in a virtual environment according to an embodiment of the present disclosure. As illustrated in FIG. 2, in the virtual environment 200 are contained a three-dimensional model 210 for a welding robot and another three-dimension model 220 for a weld object. The models 210 and 220 are both CAD models. The two models 210 and 220 are arranged in accordance with their respective real setups in the real environment. The robot as illustrated includes an arm 211 and a welding gun 212 which will be used to weld the welding object.

Figure 3:
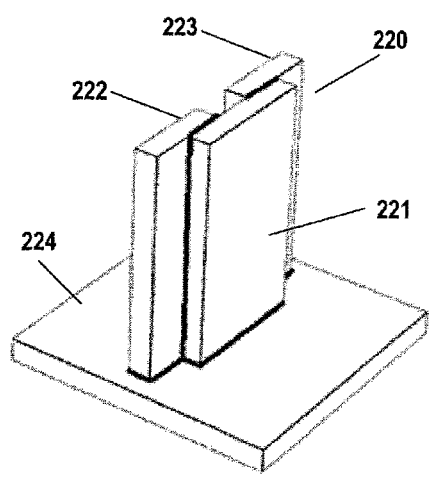
FIG. 3 schematically illustrates a detailed structure of an example welding object in a three-dimensional mode in a virtual environment according to an embodiment of the present disclosure.
Figure 4:
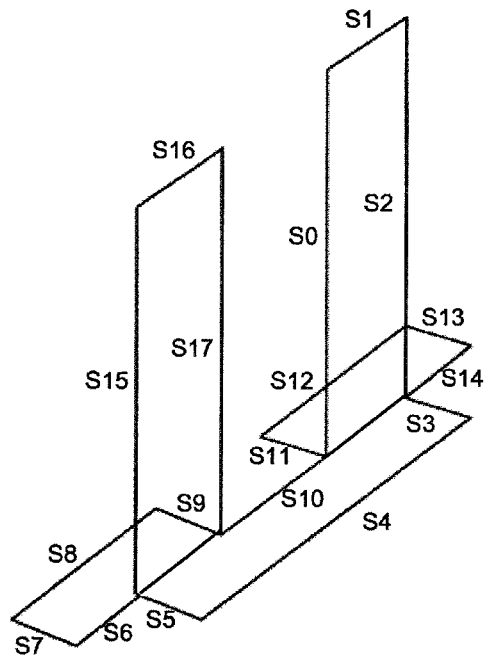
FIG. 4 schematically illustrates identified welding seams on the example welding object according to an embodiment of the present disclosure.

FIG. 3 schematically illustrates a detailed structure of the welding object in the three-dimensional mode in the virtual environment according to an embodiment of the present disclosure. As illustrated in FIG. 3, the welding object 220 is a part containing three vertical plates 221, 222 and 223 and one base plate 224 on which are arranged the three vertical plates 221, 222 and 223. Among the three vertical plates, two vertical plates 222, 223 are arranged in the same plane with a gap therebetween and main surfaces thereof are parallel to two opposite side edges of the base plate 224; and the remaining one 221 is arranged immediately before the two vertical plates covers the gap between the two vertical plates 222, 223.

For the structure of the part 220 as illustrated in FIG. 3, the intersection lines between geometrical bodies of the parts can be identified based on the geometry of respective bodies contained in the welding object. Particularly, a plate can be expressed as a body containing six surfaces wherein each surface contains four lines with each line composed of a head point and a tail point. First, geometrical bodies such as the three plates can be tagged first automatically by those methods already know in the art. Then, intersection lines between any two of the plates can be identified for example by means of Ray Tracing. In such a way, intersection lines among these plates can be identified. The intersection lines identified on the part are illustrated in FIG. 4, wherein schematically illustrates identified welding seams S1 to S16. As illustrated in FIG. 4, all intersection lines among the four plates are identified including both visible and hidden intersection lines and thus an initial seam list, or a collection of welding seams, can be obtained.

Afterwards, at step 103, as an option step, angle joint edges and butt joint edges can be identified from the welding seams based geometry of surfaces associated with the intersection line.

As is known, a geometry body usually includes several faces, and each face includes a lot of edges which can be a straight line segment or a curve segment. An intersection line between two geometry bodies is formed by 1 or 2 geometry faces on each body. Similarly, the intersection line can be a straight line segment or a curve segment. For illustrative purpose, a straight line segment will be taken as an example of intersection line.

Figure 5:
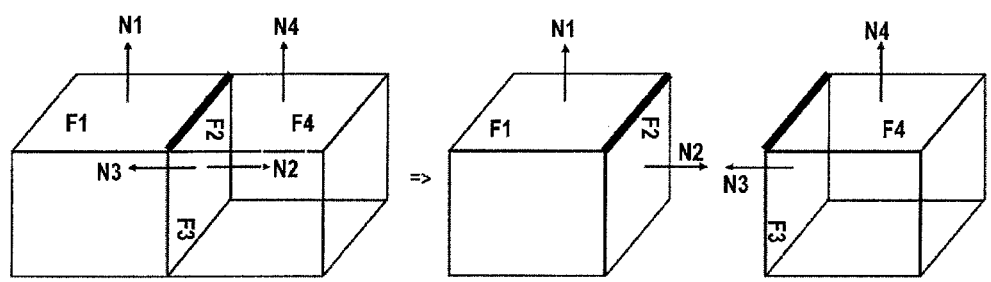
FIG. 5 schematically illustrates candidate neighbor faces of an intersection line according to an embodiment of the present disclosure.

Reference is made to FIG. 5, which illustrates candidate neighbor faces of an intersection line according to an embodiment of the present disclosure. As illustrated in FIG. 5, it is illustrated that the box A and box B are stuck together at face F2 and face F3 (hidden with each other). Thus, they have a common edge L as illustrated in a bold line. In such a case, it can be determined based on geometry of the box A that candidate neighbor faces of the edge L in box A is a collection {F1, F2}, and it can be determined based on geometry of the box B that candidate neighbor faces of the edge L on box B is a collection {F3, F4}. Generally, to judge whether a straight line is in a face, it is enough to just judge two points of the line on the face; by contrast, to judge whether a curve is in a face, it needs to judge at least 3 points of the curve on the face (curved surface or plane surface). However, the basic principles of judging are similarly.

After obtaining candidate neighbor faces of the edge L on box A and box B respectively, the next operation is to get a reasonable neighbor face collection for the edge L comprising only those faces visible from each other. For the case as illustrated in FIG. 5, there are four possible neighbor face collections: (a) {F1, F3}, (b) {F1, F4}, (c) {F2, F3}, (d) {F2, F4}. Collection (a), (c) and (d) will be excluded because they include an invisible face. The invisible face can be identified by means of geometry of the face. As illustrated in FIG. 5, all faces are plane surfaces, and in such a case the invisible faces can be identified by comparing respective normal directions N1, N2, N3 and N4 of the four faces F1, F2, F3 and F4. For example if it is found that a face F2 has normal direction N2 which is opposite to the normal direction N3 of face F3, then these two faces F3 and F2 are both invisible. If the surfaces are curved surfaces, it needs to compare their normal directions at least in three points, e.g., in a start point, an end point and a middle point of the intersection line.

Through such comparing, it can be determined that the reasonable neighbor faces of the edge L should be {F1, F4}. Thus, it is clear that faces F1 and F4 are faces associated with the edge L. Based on geometry of the two faces, it is possible to determine the welding type of a welding seam, such as an angle joint edge or a butt joint edge. For example, if the faces F1 and F4 are coplanar with each other, the corresponding edge or seam is in a butt joint type; otherwise, it relates to an angle joint. The information about the two faces may also be used as a constraint condition during creating a welding robot path for the welding robot. For example, the constraint may be that the welding gun on the robot should not collide with these two neighbor faces F1 and F4. Thus, welding types of the welding seams can be identified.

In addition, among the welding seams, there are both visible seams and hidden seams. The hidden seams are those intersection lines covered by other surfaces, which are invisible and inaccessible by the welding gun. Those hidden intersection lines are not welding seams and could be eliminated from the identified intersection.

Thus, at step S104, hidden seams may be further eliminated from the collection of welding seams for the welding object based on overlapping relationship among the welding seams to form a candidate seam list. The hidden intersections lines can also be identified based on geometry of the welding seams, particularly overlapping relationship among the welding seams. For example, a welding seam can be identified as a hidden seam if it is found that the welding line is overlapped with another welding seam. It is to be understood that if the welding seam is overlapped with another welding seam, at least three faces and two intersection lines are involved and in such case, the overlapped part should be the hidden line.

In an embodiment of the present disclosure, a tail section of a welding seam can be removed from the welding seam if the welding seam is overlapping with another welding seam at the tail section of the welding seam. Besides, if the welding seam is overlapping with the other welding seam at a head section of the welding seam, the head section of the welding seam can be removed. Furthermore, a middle part of the welding seam can also be removed if another welding seam is completely overlapping with the middle part of the welding seam. In a case that the welding seam is completely overlapping with a part of another welding seam, a welding seam can be removed completely.

For illustrative purposes, the table in FIG. 9 shows the specific rules or strategies about how to eliminate hidden lines of two straight lines based on their overlapping relationship. With reference to FIG. 9, note that line segment is a limited line with a head and a tail, its direction is from a head point to a tail point. The solid line is line1 (original line), the dashed line is line2 (cutter line); h1=head of line1; t1=tail of line1; h2=head of line2; t2=tail of line2.

In Table 1, the first column indicates the serial number of the rules; the second column indicates space or location relationship category of two lines, i.e., coplanar or not; the third column indicates a location relationship subcategory of two lines which is indicated by a value of parameter s which is the number of points (head and tail) of a body that locate on other bodies (0~4); the fourth column describes different location relationship cases in respective relationship subcategory; the fifth column shows the graphical expressions of different location relationship cases; the six column shows overlapping relationship corresponding to different location relationship cases; the seventh shows actions which shall be taken to line 1; the eight column shows output if actions are taken.

In an embodiment of the present disclosure, location relationship between line 1 and line 2 may be determined first, then the number of points of line 1 that locate on line 2 is determined, which is ranging from 0 to 4. Further, based on this information, it may further determined the overlapping relationship, such as "separated", "crossed", "ConnectedCoLine", "ConnectedNotColine", "OverlapHead", "OverlapTail", "OverlapMiddle", "OverlapALL", "OverlapALL_Equal". Among these overlapping relationships, "separated", "crossed", "ConnectedCoLine", "ConnectedNotColine" indicate that line 1 and line 2 are separated, crossed, connected and coline, and connected but not coline respectively, which all belongs to a type of Not-overlapping. The remaining "OverlapHead", "OverlapTail", "OverlapMiddle", "OverlapALL", "OverlapALL_Equal" indicate line 1 is overlapped with line 2 at the head section, at the tail section, at the middle part, at the whole part but not equal and at the whole part and equal. Regarding different overlapping type, different actions may be taken to line 1. For example, for the "OverlapHead" Type, the head section of line 1 may be removed; for the "Overlaptail" Type, the tail section of line 1 may be removed; for the "OverlapMiddle" Type, the middle part of line 1 may be removed; for the "OverlapALL" Type, the line 1, as a whole, may be removed; and for the "OverlapALL_Equal" Type, the line 1, as a whole, may be removed and at the same time it suggests line 2 should be removed too.

Figure 6:
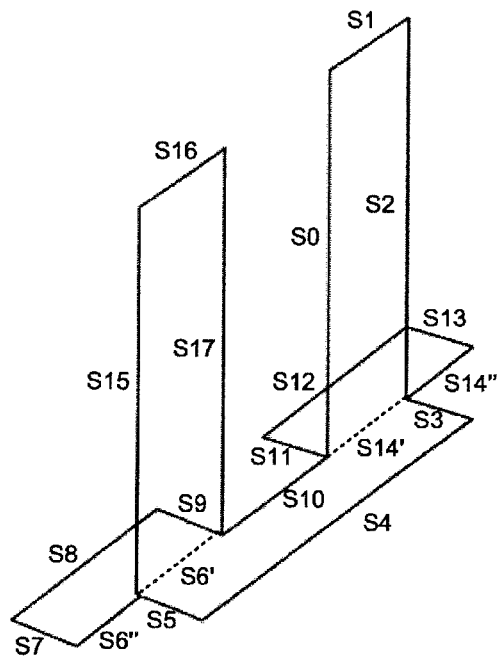
FIG. 6 schematically illustrates identified welding seams on the example welding object with hidden seams removed according to an embodiment of the present disclosure.

Based on the example elimination rules, it is possible to obtain all hidden segments from the original lines. These segments to be eliminated can be removed, for example, at the end of the above overlapping identification. For the welding seams as illustrated in FIG. 4, it can obtain the final identified welding seams or a candidate seam list as illustrated in FIG. 6. In FIG. 6, the hidden segments S6' and S14' are already removed from the welding seams S6 and S14, thereby yielding modified welding seams S6" and S14".

After a candidate welding seam list is obtained from the point of view of geometry, at step 105, the seams in the candidate seam list may be further edited based on welding process requirements so as to form a final seam list. For example, a seam may be deleted if the seam is not required to be weld. A new seam can be also added if the seam has not been identified because of assembly gap or a gap resulting mismatch in the CAD model. Two seams may also be merged if they are end to end, or a seam can be split if it is too long for welding. In addition, it is possible to reverse a direction of a welding seam, for example changing it from a direction of top-to-bottom to a direction of bottom-to-top. The editing of the welding seams can be performed automatically based on predetermined editing rules. Or alternatively and additionally, the welding seams can be checked and edited manually by a user which is skilled in the art.

Figure 7:
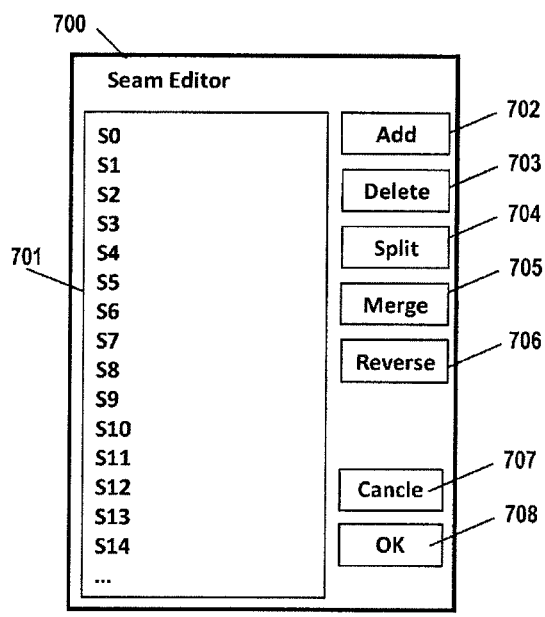
FIG. 7 schematically illustrates a seam editor according to an embodiment of the present disclosure.

FIG. 7 schematically illustrates a seam editor according to an embodiment of the present disclosure. As illustrated, the seam editor 700 comprises a list of the identified welding seams 701. The user could select one or more of them to edit by means of editing buttons 702 to 706, for example, add a new seam, delete an unnecessary seam, split one seam to two seams, merge two seams, or revere a direction of a seam. The buttons 707 and 708 can be used to cancel or confirm the editing of the seams. In such a way, the welding seams may be edited so that they are suitable for welding and thus a final seam list can be formed With embodiments of the present disclosure, the intersection lines between the geometrical bodies can be then identified based on geometry of the geometrical bodies for a collection of welding seams; and hidden seams can be further eliminated from the collection of welding seams based on geometry of the welding seams to form a candidate seam list. Thus, welding seams can be identified automatically and efficiently, which makes the automatic programing of the welding robot possible and thus facilitates use of a robot in welding huge and complex structures or structures manufactured in a small batch. Accordingly, the automatic level could be increased remarkably and the production cost can be reduced substantially.

In addition to the method described hereinabove, there is also presented an apparatus for identifying welding seams of a welding object, which will be described with reference to FIG. 8.

Figure 8:
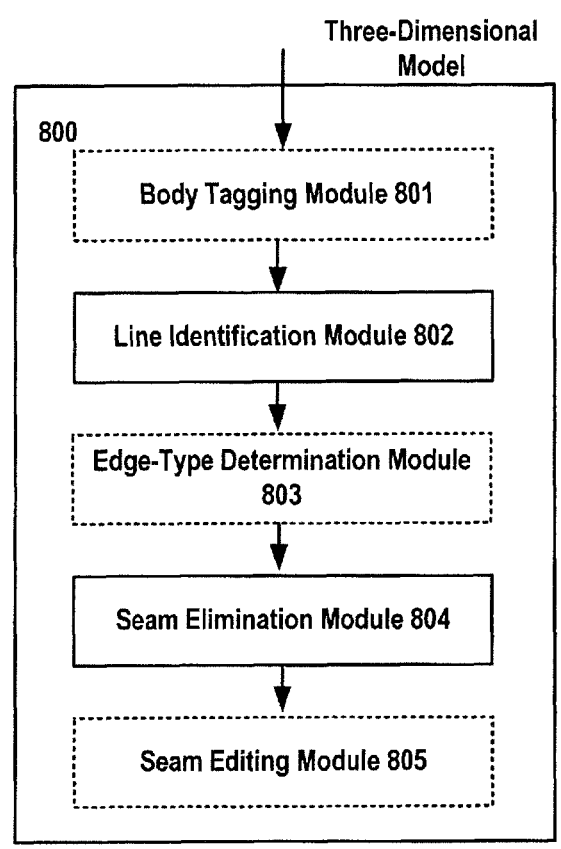
FIG. 8 schematically illustrates a block diagram of an apparatus for identifying welding seams of a welding object according to an embodiment of the present disclosure.

As illustrated in FIG. 8, there is illustrated an apparatus for identifying welding seams of a welding object. The apparatus may comprise a line identification module (802), and a seam elimination module (804). The line identification module 802 is configured to identify intersection lines between geometrical bodies (221, 222, 223, 224) of the welding object in a three-dimensional model (220) for the welding object, based on geometry of the geometrical bodies (221, 222, 223, 224) to form a collection of welding seams for the welding object; The seam elimination module 804 is configured to eliminate hidden seams (S6', S14') from the collection of welding seams for the welding object based on overlapping relationship among the welding seams to form a candidate seam list. Optionally, the apparatus may further comprise a body tagging module 801. The body tagging module 801 may be configured to tag geometrical bodies (221, 222, 223, 224) of the welding object in the three-dimensional model (220) for the welding object.

In an embodiment of the present disclosure, the edge elimination module 804 may be configured to remove a tail section of a welding seam if the welding seam is overlapping with another welding seam at the tail section of the welding seam.

In another embodiment of the present disclosure, the edge elimination module 804 may be configured to a head section of a welding seam if the welding seam is overlapping with another welding seam at the head section of the welding seam.

In a further embodiment of the present disclosure, the edge elimination module 804 may be configured to remove a middle part of a welding seam if the welding seam is overlapping with another welding seam at the middle part of the welding seam.

In a still further embodiment of the present disclosure, the edge elimination module 804 is configured to remove a welding seam if the welding seam is completely overlapping with a part of another welding seam.

In another embodiment of the present disclosure, the apparatus may optionally comprise an edge-type determination module 803, which may be configured to determine angle joint edges and butt joint edges in the collection of welding seams based on geometry of surfaces associated with the welding seams.

In a further embodiment of the present disclosure, optionally, the apparatus further may comprise a seam editing module 805, which may be configured to edit the welding seams in the candidate seam list based on welding process requirements, to form a final welding seam list.

It is to be understood that specific embodiments of the present disclosure are described with reference to the accompanying drawings; however, they are presented only for illustration purposes and the present disclosure is not limited thereto. As an example, the user interfaces as illustrated in FIG. 7 are only example interfaces; in practice, they can be modified, for example, made more complex. .The welding object as illustrated in FIGS. 2 and 3 are only for illustration; in a real application, in a real application such as a shipbuilding application, the structure of the welding object could be rather complex; however, based on similar principles and operations, the seams of a complex structure can be identified as well. Besides, the welding object is illustrated as a combination of cuboids; however, the present disclosure is not limited thereto, a welding object can contain various combinations of various bodies, such a cylinder, a cone, a sphere, a semi-sphere, or any other shape or the combination thereof and thus the skilled in the art can also identify the seams thereof from the teachings provided herein.

The skilled in the art can also appreciate that the solution as provided herein may take the form of a hardware embodiment, a software embodiment (including firmware, resident software, micro-code, etc.) or an embodiment combining software and hardware aspects. That is to say, the body tagging and the line identification, the edge determination and the edge elimination and the seam editing herein can be implemented by electronic elements or devices, software stored in storage device, or the combination of electronic devices and the software, for example by micro-processors, digital signal processor, simple chip machine, and suitable programs etc.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of identifying welding seams of a welding object, comprising:
   identifying, by one or more processors of an electronic device, intersection lines between geometrical bodies of the welding object in a three-dimensional model for the welding object, based on geometry of the geometrical bodies to form a collection of welding seams including visible seams and hidden seams for the welding object; and
   eliminating, by the one or more processors, the hidden seams from the collection of welding seams for the welding object based on overlapping relationship among the welding seams to form a candidate seam list, the hidden seams being inaccessible hidden seams covered by surfaces of the welding object.

2. The method of claim 1, wherein the method further comprises:
   tagging, by the one or more processors, the geometrical bodies of the welding object in the three-dimensional model for the welding object.

3. The method claim 2, wherein the eliminating hidden seams comprises removing, by the one or more processors, a tail section of a welding seam if the welding seam is overlapping with another welding seam at the tail section of the welding seam, the tail section being a section of the welding seam where a welding process is to end.

4. The method claim 2, wherein the eliminating hidden seams comprises removing, by the one or more processors, a head section of a welding seam if the welding seam is overlapping with another welding seam at the head section of the welding seam, the head section being a section of the welding seam where a welding process is to begin.

5. The method of claim 1, wherein the eliminating hidden seams comprises removing, by the one or more processors, a tail section of a welding seam if the welding seam is overlapping with another welding seam at the tail section of the welding seam, the tail section being a section of the welding seam where a welding process is to end.

6. The method of claim 1, wherein the eliminating hidden seams comprises removing, by the one or more processors, a head section of a welding seam if the welding seam is overlapping with another welding seam at the head section of the welding seam, the head section being a section of the welding seam where a welding process is to begin.

7. The method of claim 1, wherein the eliminating hidden seams comprises removing, by the one or more processors, a middle part of a welding seam if the welding seam is overlapping with another welding seam at the middle part of the welding seam.

8. The method of claim 1, wherein the eliminating hidden seams comprises removing, by the one or more processors, a welding seam if the welding seam is completely overlapping with a part of another welding seam.

9. The method of claim 1, further comprising:
   determining, by the one or more processors, angle joint edges and butt joint edges in the collection of welding seams based on geometry of surfaces associated with the welding seams.

10. The method of claim 1, further comprising:
    editing, by the one or more processors, the welding seams in the candidate seam list based on welding process requirements, to form a final welding seam list.

11. An electronic device, comprising:
    one or more processors; and
    memory storing computer-readable instructions, which when executed by the one or more processors, causes the one or more processors to:
    identify intersection lines between geometrical bodies of the welding object in a three-dimensional model for the welding object, based on geometry of the geometrical bodies to form a collection of welding seams including visible seams and hidden seams for the welding object; and
    eliminate the hidden seams from the collection of welding seams for the welding object based on overlapping relationship among the welding seams to form a candidate seam list, the hidden seams being inaccessible hidden seams covered by surfaces of the welding object.

12. The electronic device of claim 11, wherein the computer-readable instructions further cause the one or more processors to:
    tag the geometrical bodies of the welding object in a three-dimensional model for the welding object.

13. The electronic device of claim 12, wherein the computer-readable instructions further cause the one or more processors to remove a tail section of a welding seam if the welding seam is overlapping with another welding seam at the tail section of the welding seam, the tail section being a section of the welding seam where a welding process is to end.

14. The electronic device of claim 12, wherein the computer-readable instructions further cause the one or more processors to remove a head section of a welding seam if the welding seam is overlapping with another welding seam at the head section of the welding seam, the head section being a section of the welding seam where a welding process is to begin.

15. The electronic device of claim 11, wherein the computer-readable instructions further cause the one or more processors to remove a tail section of a welding seam if the welding seam is overlapping with another welding seam at the tail section of the welding seam, the tail section being a section of the welding seam where a welding process is to end.

16. The electronic device of claim 11, wherein the computer-readable instructions further cause the one or more processors to remove a head section of a welding seam if the welding seam is overlapping with another welding seam at the head section of the welding seam, the head section being a section of the welding seam where a welding process is to begin.

17. The electronic device of claim 11, wherein the computer-readable instructions further cause the one or more processors to remove a middle part of a welding seam if the welding seam is overlapping with another welding seam at the middle part of the welding seam.

18. The electronic device of claim 11, wherein the computer-readable instructions further cause the one or more processors to remove a welding seam if the welding seam is completely overlapping with a part of another welding seam.

19. The electronic device of claim 11, wherein the computer-readable instructions further cause the one or more processors to determine angle joint edges and butt joint edges in the collection of welding seams based on geometry of surfaces associated with the welding seams.

20. The electronic device of claim 11, wherein the computer-readable instructions further cause the one or more processors to edit the welding seams in the candidate seam list based on welding process requirements, to form a final welding seam list.

\* \* \* \* \*